Oct. 25, 1949.    D. P. BALAIS    2,485,997
AUTOMOBILE LOCK
Filed Nov. 4, 1948
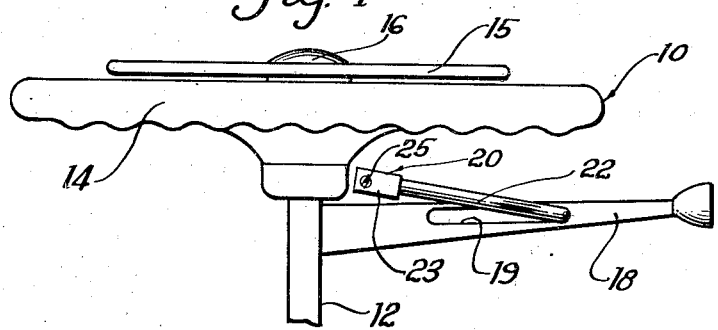
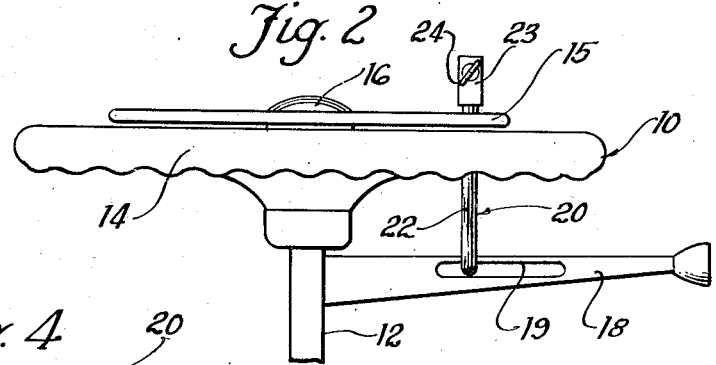
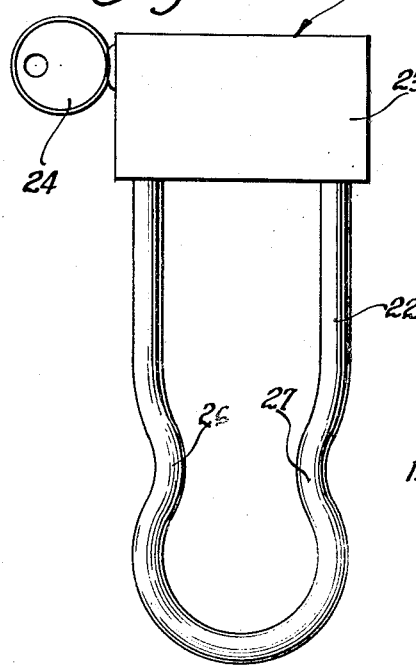
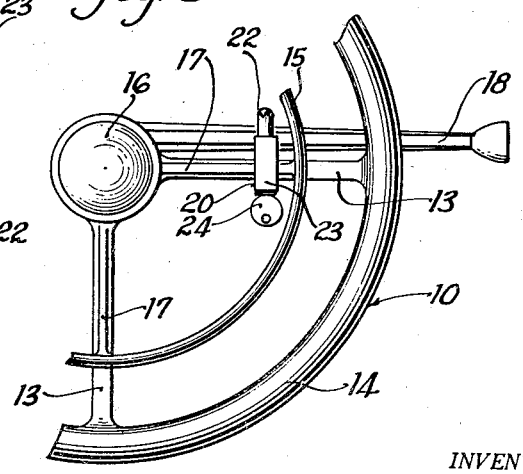
INVENTOR.
Daniel P. Balais
BY Albert G. McCaleb
Atty Patented Oct. 25, 1949

2,485,997

UNITED STATES PATENT OFFICE 2,485,997

AUTOMOBILE LOCK

Daniel P. Balais, Chicago, Ill.

Application November 4, 1948, Serial No. 58,338

2 Claims. (Cl. 70—212)

This invention relates to automobile locks, and more particularly to such locks and a system for locking automobiles which prevents the operation of the automobile even though the usual ignition lock may be short circuited or otherwise rendered ineffective.

One of the objects of my invention is to provide a system for locking automobiles and the like which is adapted to supplement or replace those commonly in use and which is effective to render inoperative one or more vital parts of the operating mechanism.

As another object, it is within the purview of this invention to provide a locking system for automobiles which is effective to prevent the shifting of gears or the movement of the gear shift lever from its "neutral" position.

My invention further comprehends a locking system and lock adapted to interlink the steering wheel, shifting lever and horn operating element of an automobile.

It is another object of the invention to provide a steering wheel lock for automobiles which, although it is a separable unit, has operative and inoperative positions handy to the driver and between which it is readily movable; the inoperative position being out of the way of normal driving operations.

Other objects and advantages of the invention will be apparent from the following description and the accompanying drawings in which similar characters of reference indicate similar parts throughout the several views.

Referring to the one sheet of drawings,

Figs. 1 and 2 are fragmentary front elevational views depicting parts of an automobile or the like and and illustrating two positions of a preferred form of my automobile lock as applied and adapted thereto;

Fig. 3 is a fragmentary top plan view of a structure shown in Figs. 1 and 2 and with the parts in the position illustrated in Fig. 2, and Fig. 4 is a side elevational view drawn to a scale considerably larger than that used in the other figures and which illustrates a preferred form of a locking device utilized in the disclosed invention.

In the exemplary embodiment of my invention which is depicted in the accompanying drawings for illustrative purposes, I have shown the adaptation of my lock to structural parts which are associated together and normally movable relative to one another in the normal operation of currently produced automobiles. That is, a steering wheel 10 is supported for rotation at the end of a steering column 12 and includes spokes 13 and a rim 14 which serves as a grip for steering the automobile. Above the steering wheel and in substantially concentric relationship thereto is a horn operating ring 15 supported from a central cap structure 16 by spokes 17; the latter spokes 17 preferably being disposed in substantially parallel relationship to spokes 13 of the steering wheel. A gear shifting lever 18 extends outwardly from the steering column at a position adjacent and below the steering wheel, the gear shifting lever being supported for swinging movement relative to the steering column for shifting gear ratios or for effecting a transition from a neutral to a driving position.

In adapting the gear shifting lever 18 to the disclosed and preferred embodiment of my invention, it is provided with a longitudinally extending slot 19 at a position such that at least a portion of the slot is directly under the spoke portion of the steering wheel, so that in a certain position or positions of the steering wheel, one of the spokes 13 of that wheel is in aligned and substantially parallel relationship to the gear shifting lever 18 and the slot 19. For locking the automobile, I provide a padlock 20 having a substantially U-shaped hasp 22 and a lock body 23, which body is adapted to bridge the ends of the hasp and includes a lock mechanism for effectively locking the body in its hasp bridging position. In the disclosed embodiment of the invention, the lock is controlled by a key 24 insertable into a key hole 25 which is desirably disposed at a readily accessible position at one side of the lock body. In the present instance, the key is disposed to face toward the operator of the automobile when the lock is in either its locking or unlocked positions.

For locking purposes, the lengths of the side legs of the U-shaped hasp are such that when the closed end of the hasp is engaged in the slot 19 in the gear shifting lever, those side legs extend upwardly through the steering wheel and horn operating ring and straddle spokes thereof, as shown in Figs. 2 and 3. Thus, when the lock body is placed in its bridging position across the ends of the hasp legs, the gear shifting lever is effectively locked to the spokes of the steering wheel and horn operating ring. With hasp legs of preferred lengths, the gear shifting lever cannot be moved sufficiently to change its operating position when locked to the spoke. It may be observed that the locking of a steering wheel spoke to the gear shifting lever prevents appreciable movement of the steering wheel. Additionally, and as a preferred feature, movements of either the steering wheel or the gear shifting lever, while thus locked, will cause the horn operating ring to be moved so as to blow the horn and sound a signal.

As a further preferred proportion, the slot 19 in the gear shifting lever and its disposition along the lever are not only related to the lengths of the hasp legs so as to provide for the movement of the hasp between its locking and released positions, but those parts are preferably so proportioned that the lock body may be carried on the hasp in a readily accessible, but out-of-the-way, position extending along the gear shifting lever with the lock body supported above the inner end of that lever as shown in Fig. 1. In order to prevent undesirable rattling of the padlock during operation of the automobile and when resting in its released position along the gear shifting lever, I have provided opposed and inwardly bent portions 26 and 27 which bridge one another to a sufficient extent that they engage and rest against the upper surface of the gear shifting lever when the lock is in the released position as shown in Fig. 1. Thus, the weight of the lock body tends to hold the padlock against the gear shifting lever and that lock body is preferably supported at a position above the inner end of the gear shifting lever.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an automobile or the like having a steering wheel and a gear shifting lever in adjacent relationship, and said gear shifting lever having a slot therein, the combination therewith of a padlock having a lock body and a hasp, said hasp being of a size and shape such that the padlock has a locked position wherein the hasp extends through said slot and straddles a portion of the steering wheel with the lock body on the side of the steering wheel opposite the gear shifting lever.

2. In an automobile or the like, the combination as defined in claim 1, and additionally characterized by the positioning and length of said slot being in such relationship to the length of the hasp that said padlock may be carried with the hasp extending through the slot and the lock body disposed above the gear shifting lever and at the end thereof adjacent the mid-portion of the steering wheel.

DANIEL P. BALAIS.

REFERENCES CITED

The following references are of record in the file of this patent:

UNITED STATES PATENTS

| Number | Name | Date |
|---|---|---|
| 1,283,493 | Garner | Nov. 5, 1918 |
| 1,288,905 | Isom | Dec. 24, 1918 |
| 1,292,114 | Smith | Jan. 21, 1919 |
| 1,623,029 | Behning | Mar. 29, 1927 |